United States Patent

[11] 3,617,302

| [72] | Inventor | Thomas W. Collins<br>Elgin, Ill. |
|---|---|---|
| [21] | Appl. No. | 743,044 |
| [22] | Filed | July 8, 1968 |
| [45] | Patented | Nov. 2, 1971 |
| [73] | Assignee | Kraftco Corporation<br>Continuation-in-part of application Ser. No. 670,778, Sept. 26, 1967, now abandoned. |

[54] PREPARATION OF A FLOWABLE PARTICULATE COMPOSITION
4 Claims, No Drawings

[52] U.S. Cl. .................................................. 99/56,
99/28, 99/29, 99/57, 99/98, 99/199, 99/203
[51] Int. Cl. .................................................. A23c 9/00,
A23c 1/00
[50] Field of Search .................................. 99/56, 54,
57, 203, 91, 92; 670/778

[56] References Cited
UNITED STATES PATENTS

| 2,911,300 | 11/1959 | Peebles ..................... | 99/56 |
|---|---|---|---|
| 3,072,486 | 1/1963 | Oakes et al. ................ | 99/56 |
| 3,142,569 | 7/1964 | Scheidegger ............... | 99/56 X |
| 3,185,580 | 5/1965 | Hanrahan et al. .......... | 99/57 X |
| 3,370,958 | 2/1968 | Freund ........................ | 99/92 X |

*Primary Examiner*—Lionel M. Shapiro
*Assistant Examiner*—D. M. Naff
*Attorney*—Anderson, Luedeka, Fitch, Even and Tabin ABSTRACT: A process is provided whereby a liquid material may be added to a substantially dry carrier by mechanical mixing, and whereby the resultant mixture remains particulate and flowable. The carrier is treated to provide an expanded, substantially spherical structure capable of holding the desired level of liquid. Any liquid may be used so long as it does not dissolve the solid carrier. The liquid may be normally liquid at room temperature or may be a material that may be liquid at room temperature or may be a material that may be liquefied by mild heating.

PREPARATION OF A FLOWABLE PARTICULATE COMPOSITION

This application is a continuation-in-part of my copending application, Ser. No. 670,778, filed Sept. 26, 1967 now abandoned.

The present invention relates generally to a flowable particulate composition and more particularly relates to flowable particulate compositions containing a liquid or liquefiable material.

Flowable particulate compositions containing a liquid or liquefiable material, hereinafter sometimes referred to as powdered compositions, offer the advantage of ease of handling and of ease of incorporation with other dry ingredients during the preparation of various food products. For example, the use of shortenings which are in the form of powdered compositions provide a great advantage to a cake mix manufacturer by eliminating costly and time-consuming operations. Liquid fat compositions in particulate form are also potentially useful in the formation of dry salad dressing mixes which may be reconstituted by addition of a suitable liquid. Powdered compositions containing other liquids or liquefiable materials, such as emulsifying agents, alcohols, organic acids of the like, also offer potential advantages to the food industry. As used herein the term "liquefiable material" refers to materials which are substantially solid at room temperature but which are readily liquefied under mild heating conditions of up to about 100° C. and which are not readily obtainable in a flowable particulate form.

Powdered compositions containing an edible liquid, such as a fat, have been produced wherein small amounts of the liquid are encased in a coating of an edible, water-soluble, proteinaceous or carbohydrate solid. For example, compositions have been formed by spray drying emulsions of a shortening or liquid fat and nonfat milk solids.

Proteinaceous materials other than nonfat milk solids, such as gelatin and sodium caseinate, have also been used to provide powdered fat compositions. Carbohydrate materials, such as starches and sugars, have also been employed either separately or in combination as edible encapsulating solids for fats or other liquids. However, such prior art powdered fat compositions have not been entirely satisfactory in that the fat is often bound so thoroughly by the encapsulating solid that easy recovery of the fat when desired is not possible. Furthermore, it has not always been possible to provide as high level of fat in such powdered fat compositions as might be desired. Also, prior art powdered compositions have been limited as to the type of fat or other liquid that could be incorporated or encapsulated with an edible solid.

Accordingly, it is an object of the present invention to provide an improved flowable, particulate composition. It is another object of the present invention to provide powdered compositions containing a liquid wherein the liquid is readily released. It is a further object of the present invention to provide flowable, particulate food compositions containing a liquid or liquefiable material. It is still further object of the present invention to provide improved flowable, particulate fat compositions.

These and other objects of the present invention will be more particularly described in the following description.

In general, in accordance with a process embodying various of the features of the present invention, a liquid material is added to a solid carrier by mechanical mixing. The carrier is previously treated to provide an expanded structure capable of holding the desired level of liquid. In general, any liquid may be used as long as it does not dissolve the solid. The liquid state may be achieved by mild heating of materials that are normally solid at room temperature or a material that is normally liquid at room temperature may be used.

Any solid may be used in the practice of the present invention which may be treated to provide a carrier with an expanded, substantially spherical structure as will be more fully described hereinafter. Such solids include edible proteinaceous materials and carbohydrate materials. In particular, suitable edible solids for providing the carriers of the present invention include gelatin, nonfat milk solids, whey, fortified whey products, modified milk products, caseinates, lactose, carrageenan, egg albumen, soy flour, soy protein, gum arabic, and combinations thereof. Certain of the above materials may be combined with a film-forming protein, such as gelatin, egg albumen or soy protein, to provide a stronger, more rigid structure, as will be explained more fully hereinafter.

Solids which may be used as carriers in the present invention may be treated by any suitable method to provide suitable expansion characteristics. One suitable method for producing the carriers of the present invention is by gas injection spray drying. In this method of drying a gas, usually air, is injected into a liquid solution or suspension of the solid prior to spraying the liquid into the liquid solution or suspension to be dried at a pressure in excess of that required to effect atomization in a spray nozzle or that required to operate a centrifugal spray wheel. When the liquid solution of suspension is atomized to form droplets the pressure is reduced and the injected gas expands within a droplet. The expanded droplets then are dried to form expanded substantially spherical particles. The powdered material thus produced has a lower density than conventional spray-dried powder. The density of the powdered material can be varied by changing concentration of the carrier in the suspension, the level of gas injected, the type nozzle or centrifugal wheel used, the flow rate of the liquid being pumped or the pumping pressure.

When a single fluid nozzle is used to effect atomization in a spray dry chamber, the liquid to be atomized is generally pumped to the nozzle at a pressure of from about 300 p.s.i.g. to about 5,000 p.s.i.g. To effect suitable expansion of the atomized droplets of the liquid, the injected gas should be introduced into the liquid at a pressure in excess of the liquid pumping pressure by from about 20 p.s.i.g. to about 500 p.s.i.g., i.e., a total gas injection pressure of from about 320 p.s.i.g. to about 5,500 p.s.i.g. It will, of course, be understood by one skilled in the art that pumping pressures vary with the type nozzle used, with the particular liquid solution or suspension being atomized, and with the desired particle size distribution of the atomized droplets. The gas pressure of the injected gas stream will also vary, depending upon the degree of expansion desired in the atomized droplets, i.e., the desired level of reduction in bulk density of the dried particulate solid.

When a centrifugal wheel or a two fluid spray nozzle is used to effect atomization, pumping pressures for the liquid to be atomized may be greatly reduced, i.e., to from about 25 p.s.i.g. to about 100 p.s.i.g. In this case, the pressure of the gas injected into the flowing liquid stream is from about 5 p.s.i.g. to about 50 p.s.i.g. above the pressure of the flowing liquid stream.

In general, it is desired to use carriers having bulk densities of from about 0.30 g./cc. to about 0.03 g./cc. Bulk density as used herein refers to weight of a given volume of the dried solid, without packing of the solid in the container. The level of liquid or liquefiable material that may be held by the carrier to provide a particulate flowable composition depends on the bulk density of the carrier, the particle size distribution of the carrier, and the structural strength of the expanded spherical particles. In general, it is desired to use low density carriers having a particle size of from about 0.001 inches to about 0.100 inches and a bulk density of from about 0.03 g./cc. to about 0.30 g./cc.

While not wishing to be bound by any theory, it is believed that the liquid or liquefiable material is held by the carrier primarily by surface attraction Consequently, it is believed the level of liquid or liquefiable material that may be held by the carrier and still provides a flowable, particulate material is dependent on the total surface area of the dried carrier and the surface tension characteristics of the liquid or liquefiable material. The surface area of the carrier is, in turn, related to the bulk density, particle size distribution and shape of the carrier. It is further believed that the flowable particulate characteristic of the combination of carrier and liquid of liquefiable material is attributable, in part, to the substantially spherical configuration and the substantially nonagglomerated condition of the individual particles of the carrier. This, it is believed, permits surface coating of the particles by the liquid or liquefiable material through a surface attractive phenomena and independent movement of the particles thereafter.

For the reasons described above it is preferred to provide the carrier in substantially spherical or spheroidal shape, It should be understood, however, that a substantial proportion of the carrier may exist as fractured particles without departing from the scope of the invention. The maximum level of liquid which may be carried by the carrier is dependent on the proportion of fractured particles present in the carrier. As much as 25 percent of the carrier may exist as fractured particles without substantially reducing the level of liquid which may be carried. Even when as high as 80 percent of the carrier is present as fractured particles there is still an increase in the level of liquid which may be carried over what could be carried by the same material without treatment in accordance with the invention.

Carriers produced in the above manner by gas injection spray drying may then be blended with liquid or liquefiable material in conventional dry blending equipment. The liquid may be sprayed or poured onto the low density carrier in the mixer. When liquefiable materials are being added they may be first heated to provide these in fluid form. Some liquefiable materials, such as plastic fats, may be simply blended by adding them to the carrier and stirring till blended. When the liquid is a fat or oil, the fat may be added up to levels of about 80 percent, depending upon the particular carrier being used and the conditions of mixing. At certain levels of fat or oil, depending upon the particular carrier, a critical content is reached, the carrier breaks down, and a paste is formed.

In this connection, it is desirable to use dry mixing equipment that is not abusive to the carrier. It has been found that vertical axis blenders, such as kitchen type mixers are less abusive than horizontal axis mixers, such as ribbon blenders. The level of liquid which may be held is dependent on the degree of breakdown of the particle size of the carrier. For certain types of carriers, such as whey or nonfat milk solids, the level of breakdown may be reduced by the inclusion of strengthening agent such as film-forming protein. Such proteins as sodium caseinate, egg albumen or gelatin may be used. The protein acts to provide a stronger particle, which is less subject to breakdown during mixing. For example, with whey as the carrier, levels of protein of as low as 5 percent by weight of whey solids provide a substantially stronger particle.

As stated above, any liquid or liquefiable material may be used in the present invention which does not dissolve or react with the carrier. As previously stated, liquefiable materials refer to those materials which are substantially solid at room temperature but which are readily made flowable under mild heating conditions of up to about 100° F. Suitable liquids or liquefiable materials include, but are not limited to, cottonseed oil, hydrogenated solid fats, emulsified hydrogenated fats, lard, pimento oil, margarine fat, butter oil, butter, chicken fat, emulsifying agents, ethyl alcohol, succinylated monoglyceride, and glacial acetic acid. Aqueous solutions or dispersions may be added to suitable film-forming hydrophobic carriers, such as polyvinyl alcohol or carboxy methyl cellulose. While the invention has been sometimes particularly described with respect to blending and carrying fat or oil in a flowable particulate form, any liquid can be sued with the carrier of the present invention, provided that the liquid does not dissolve the carrier or destroy its structural form.

The carrier of the invention may be combined with other materials prior to adding the liquid thereto to provide products, such as dry cake mixes or pie crust mixes. For example, it is known to prepare dry cake mixes containing fat with which the housewife may prepare cake batter simply by the addition of suitable fluids. Such known cake mixes are not entirely satisfactory in the total level of fat that can be provided in the finished cake. In general, such known cake mixes can only provide a level of fat in the cake mix of up to about 13 percent by weight before blocking of the mix is encountered. The term "blocking" refers to the tendency of the particles of the cake mix to adhere to each other and to become nonflowing. When dry cake mixes ingredients, such as sugar, flour, salt, dry egg whites and baking powder are combined with a carrier of the invention, the fat level may be increased in the cake mix to any desired level which is considered suitable for finished cakes without encountering blocking in the cake mix.

In this connection, the higher the level of fat that is desired in the cake mix the higher the level of carrier that should be used. For example, to provide a level of about 16 percent by weight fat in the cake mix, the carrier should be present in the cake mix at a level of from about 2 percent to about 5 percent by weight of the mix. The level of carrier required is dependent on the bulk density of the carrier and the particular carrier selected.

The following examples further illustrate various features of the present invention, but are intended to in no way limit the scope of the invention, which is defined in the appended claims.

EXAMPLE I

Sweet whey obtained from a cottage cheese make process was concentrated to a level of 35 percent solids. The whey was pumped at a pressure of 2,200 p.s.i.g. to a single fluid nozzle in a spray dry chamber. Prior to reaching the nozzle, air was injected into the flowing stream of whey at a level of 2,500 p.s.i.g. The whey was then atomized in the spray dry chamber and was dried to a level of 3.5 weight percent moisture. The whey had a bulk density of 0.08 g./cc. Refined and bleached cottonseed oil was then poured onto the surface of 100 grams of the whey as the whey was being stirred in a vertical axis kitchen blender. The level of oil that could be added prior to a breakdown of the whey into a lumpy powder or paste was 66 percent by weight. Whey which had been spray dried in a conventional manner without gas injection, and which had a bulk density of 0.313, broke down into lumpy powder at a level of 29 percent oil by weight.

An acceptable powdered material was prepared with the whey produced by the above gas injection method containing 60 percent by weight cottonseed oil. The powdered material was not oily in appearance, but when added to water readily released the oil is less than 10 seconds.

EXAMPLE II

The method of Example I was used to spray dry sweet whey in accordance with the following table, to provide whey carriers with indicated bulk densities. Liquid cottonseed oil was then added to the whey carrier in a vertical axis kitchen blender.

| Sample Number and Material | Density g./cc. | Maximum Wt. Percent Oil to Provide Acceptable Powdered Product | Weight Percent Oil at Breakdown to Lumpy Powder or Paste |
| --- | --- | --- | --- |
| 1—whey (from Example 1) | 0.13 | 60 | 66 |
| 2—whey | 0.11 | 66 | 69 |
| 3—whey | 0.09 | 69 | 72 |
| 4—whey | 0.07 | 70 | 72 |
| 5—whey | 0.313 (control no gas injection during spray drying) | 29 | |

From the above table, it can be readily seen that liquid oil may be blended with the particulate carriers of the present invention to provide free-flowing particulate materials with oil levels in excess of 50 percent. It can also be seen that spray drying conditions for producing the carriers may be varied to decrease the bulk density of the carrier and to increase the level of liquid oil that may be incorporated into the product.

When a water soluble carrier, such as whey, is used to hold a liquid oil, the release properties, when added to water or other aqueous liquid, such as milk, are exceptional. When the powdered fat compositions produced by the present invention are compared with powdered fat compositions prepared by cospray drying of an emulsified mixture of whey and fat or oil, the flowable, particulate compositions of the present invention release fat within a substantially reduced period over the codried powdered fat composition.

EXAMPLE III

A particulate whey carrier was prepared in accordance with the method of example I, with the exception that 6 weight percent (dry basis) of sodium caseinate was incorporated into the whey solution prior to spray drying. The whey mixture was spray dried to provide a carrier with a bulk density of 0.08 g./cc. To the resultant low density whey carrier cottonseed oil was added at levels of up to 76 weight percent before breakdown to a paste was observed. An acceptable powered fat composition was produced containing 70 percent cottonseed oil. It is believed that the addition of the sodium caseinate protein to the whey results in increasing the strength of the resultant expanded, substantially spherical particles produced by spray drying. This prevents subsequent breakdown of the particles during dry blending of the liquid oil with the particles.

EXAMPLE IV

A dry powdered salad dressing composition was prepared which could be reconstituted with water to provide a cream type salad dressing, in accordance with the following method:

Dry whey solids were made into a solution at a level of 35 weight percent. The solution of dry whey solids was then air injection spray-dried using a liquid pumping pressure of 1,900 p.s.i.g. and an air injection pressure of 2,200 p.s.i.g. The spray-dried whey carrier had a density of 0.08 grams per cc. 2.13 grams of glacial acetic acid were then blended with 69.75 grams of refined and bleached cottonseed oil. The liquid mixture was then added slowly to 34.80 grams of the low density dry whey solids carrier in a vertical axis type mixer. The resultant product, with a liquid level of 65.77 weight percent, had the appearance of a dry, granular, free-flowing powder. To this powder was then added a cheese-garlic spice mixture to provide a dry powdered salad dressing composition.

When desired, the dry powdered salad dressing composition could be reconstituted by mixing 85 grams of the dry salad dressing composition with 50 grams of water and shaking the resultant mixture until a homogeneous cream type salad dressing was obtained. The resultant reconstituted salad dressing had a desirable texture and cream-type appearance.

EXAMPLE V

A combination of 96 weight percent lactose and 4 weight percent gelatin was air injection spray-dried to provide a lactose-gelatin carrier having a density of 0.07 grams per cc. Chicken fat was then mixed with the lactose/gelatin carrier to provide a flowable, particulate composition containing 65 weight percent chicken fat. The composition was not oily in appearance, but when added to water readily released the chicken fat in less than 10 seconds.

EXAMPLE VI

To the lactose-gelatin carrier prepared in example V was added ethanol at a level sufficient to provide 65 weight percent ethanol. A flowable, particulate material was obtained. When added to water the ethanol was readily released in less than 10 seconds.

EXAMPLE VII

A cake mix was prepared which contained a low density whey carrier prepared in accordance with the method of example I. The carrier had a bulk density of 0.08 g./cc. The cake mix contained the following ingredients at the indicated levels:

| Ingredients | Weight Percent |
| --- | --- |
| Cake flour | 33.52 |
| Salt | 1.00 |
| Baking Powder | 2.09 |
| Sugar | 37.84 |
| Nonfat dry milk | 2.77 |
| Dry egg whites | 2.64 |
| Shortening | 17.76 |
| Carrier (Whey prepared in accordance with Example I) | 3.38 |

The cake mix was prepared by blending together the dry ingredients listed above and thereafter adding the shortening thereto. The shortening was melted and was added to the dry ingredients as they were gently stirred. A dry free flowing cake mix was obtained.

A similar cake mix was prepared without the whey carrier of the invention. It was possible to only add 12.5 percent shortening based on the weight of the mix, before the mix developed a pasty appearance and was considered unsuitable for packaging as a cake mix.

A cake was prepared from the cake mix of example VII and was compared with a cake which had been made from a mix without the whey carrier of the invention and which contained 10.0 percent by weight shortening. The cake from the mix of example VII was considerably moister and more pleasing in texture than the cake prepared from the other cake mix.

EXAMPLE VIII

A pie crust mix was prepared containing a low density whey carrier made by the method of example I. The carrier had a bulk density of 0.08 g./cc. The pie crust mix contained the following ingredients at the indicated levels:

| Ingredients | Weight Percent |
| --- | --- |
| Pastry flour | 62 |
| Shortening | 32 |
| Carrier (Whey prepared in accordance with the method of Example I) | 5 |
| Salt | 1 |

The pie crust mix was prepared by blending together the dry ingredients and thereafter adding the plastic shortening in small amounts while continuously agitating the mix. A dry free-flowing pie crust mix was obtained.

Various of the features of the invention are set forth in the following appended claims.

1. A method for making a flowable, particulate composition containing an edible solid and an edible liquid additive comprising forming a liquid dispersion of said solid, injecting a gas into said dispersion, spray drying said dispersion containing said injected gas to provide substantially nonagglomerated particles of substantially dry solid, said particles having an expanded, substantially spherical structure with a bulk density of from about 0.03 to about 0.30 grams per cubic centimeter, and said particles being from about .001 inches to about 0.100 inches in size and thereafter blending said liquid additive with said spray dried solid, said solid being substantially insoluble in said liquid additive and being selected from the group consisting of nonfat milk solids, modified milk products, whey, fortified whey products, gelatin, caseinates, lactose, carrageenan, egg albumen, soy flour, soy protein, gum arabic or mixtures thereof, said liquid additive being selected from normally liquid or liquefiable materials with melting points less than about 200° F., and said liquid additive being blended with said solid at a level of at least about 25 percent by weight of the flowable, particulate composition.

2. The method of claim 1 wherein said liquid additive is blended with said spray-dried solid at a level of from about 25 percent to about 80 percent by weight of the flowable, particulate composition.

3. The method of claim 1 wherein said edible liquid is selected from the group consisting of liquid oil, liquid fat, hydrogenated oil, solid fat, alcohols, acids, or mixtures thereof.

4. The produced in accordance with the method of claim 1.

UNITED STATES PATENT OFFICE
CERTIFICATE OF CORRECTION

Patent No. 3,617,302　　　　　　　　　　Dated November 2, 1971

Inventor(s) Thomas W. Collins

It is certified that error appears in the above-identified patent and that said Letters Patent are hereby corrected as shown below:

```
Column 1, line 22, "of" should be --or--.
Column 1, line 66, "as" should be --so--.
Column 2, line 18, "of" should be --or--.
Column 3, line 9, the comma (,) should be a period (.).
Column 3, line 43, before "strengthening" insert --a--.
Column 3, line 44, after "as" insert --a--.
Column 3, line 66, "sued" should be --used--.
Column 4, line 6, "mixes" should be --mix--.
Column 4, line 41, before "lumpy" insert --a--.
Column 5, line 24, "powered" should be --powdered--.
Column 6, line 16, "17.76" should be --16.76--.
Column 8, line 6, Claim 4, before "produced" insert
                                       --product--.
```

Signed and sealed this 2nd day of May 1972.

(SEAL)
Attest:

EDWARD M. FLETCHER, JR.　　　　　　　ROBERT GOTTSCHALK
Attesting Officer　　　　　　　　　　Commissioner of Patents